US 6,532,471 B1

United States Patent
Ku et al.

(10) Patent No.: US 6,532,471 B1
(45) Date of Patent: Mar. 11, 2003

(54) INTERFACE REPOSITORY BROWSER AND EDITOR

(75) Inventors: William Hsiao-Yu Ku, Austin, TX (US); Joey Allen Perry, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 09/734,806

(22) Filed: Dec. 11, 2000

(51) Int. Cl.[7] .............................. G06F 17/30; G09G 5/00
(52) U.S. Cl. ................... 707/102; 707/103 R; 707/100; 707/101; 345/76; 345/156
(58) Field of Search ................................. 707/100, 101, 707/102, 103 R; 345/76, 156

(56) References Cited

U.S. PATENT DOCUMENTS

| | | | | |
|---|---|---|---|---|
| 5,826,085 A | * | 10/1998 | Bennett et al. | 395/683 |
| 5,926,637 A | | 7/1999 | Cline et al. | 395/701 |
| 5,940,075 A | | 8/1999 | Mutschler, III et al. | 345/335 |
| 5,966,707 A | | 10/1999 | Van Huben et al. | 707/10 |
| 5,974,430 A | | 10/1999 | Mutschler, III et al. | 707/505 |
| 6,012,067 A | * | 1/2000 | Sarkar | 707/103 |
| 6,023,579 A | * | 2/2000 | Hellgren et al. | 707/102 |
| 6,457,009 B1 | * | 9/2002 | Bollay | 707/10 |

FOREIGN PATENT DOCUMENTS

| | | | | |
|---|---|---|---|---|
| EP | 0 817 046 A2 | * | 7/1998 | G06F/9/46 |
| EP | 1 133 102 A2 | * | 12/2001 | H04L/12/24 |
| WO | 99/63436 | * | 12/1999 | G06F/9/46 |

OTHER PUBLICATIONS

Smith et al., A Case for Meta–Interworking: Projecting COBRA Meta—Data into COM, IEEE, 1998, pp. 242–253.*
Seacord et al., A search engine for Software Component, IEEE, 1998, pp. 62–70.*
Senivonge, An Approach to Making COBRA Support Equivalence Relationships, IEEE, 1999, pp. 233–244.*
Cimpu et al., Dynamic Managed Objects for Network Management, IEEE, 1999, pp. 156–161.*
Heuser et al., Development of Distributed and Client/Server Object–Oriented Applications: Industry Solutions, IEEE, 1999, pp. 317–323.*

(List continued on next page.)

Primary Examiner—Frantz Coby
(74) Attorney, Agent, or Firm—Robert H. Frantz; David A. Mims, Jr.

(57) ABSTRACT

A system, method and user interface for visually browsing and editing one more or CORBA Interface Repositories ("IR") for program objects. A user selects an Interface Repository and an object within the Interface Repository. The IR Browser/Editor presents a three-pane view graphically depicting a containment tree, an object's interface definition language, and an inheritancy diagram of the selected object. The user may review the full interface definition language of the object, save the IDL or cut-and-paste it to another program such as a code editor for compiling. The user may also select a parent or child object within any of the three panes of the display, which causes the inheritance diagram, containment tree, and IDL panes to be updated to show the parent and child interfaces of the selected object, and the containment tree and IDL for the selected object, accordingly. The user may "browse" graphically through a containment tree, an IDL listing, or an inheritance diagram, interactively, but successively selecting objects shown in each view. Optionally, the user may control the level of detail shown in each pane, and may choose to filter the information presented according to user preferences. The user may edit an Interface Repository as he "browses" it by copying, adding, and deleting objects in the database.

12 Claims, 5 Drawing Sheets

OTHER PUBLICATIONS

Chockler et al., Implementing a Caching Service for Distributed COBRA Objects, Middleware 2000, LNCS 1795, pp. 1–23.*

Arulanthu et al., The Design and Performance of a Scalable ORB Architecture for COBRA Asynchronous Messaging, Middleware 2000, LNCS 1795, pp. 208–230.*

Rana et al., A Wrapper Generator for Wrapping High Performance Legacy Codes as Java/COBRA Components, IEEE, 2000, pp. 1–12.*

Selig et al., Data Analysis and Reporting for Real–Time Ada Systems, 1992 ACM, pp. 469–476.*

Mills et al., A Knowledge–Based Method for Inferring Semantic Concepts from Visual Models of System Behavior, ACM Transactions on Software Engineering and Methodology, vol. 9, No. 3, Jul. 2000, pp. 306–337.*

* cited by examiner

INTERFACE REPOSITORY BROWSER AND EDITOR

BACKGROUND OF THE INVENTION

1. Field of the Invention

This invention relates to the arts of object oriented programming, and to tools for browsing and editing interface repositories on local and remote object servers. This invention relates especially to graphical browsers of interface repositories for CORBA remote and local object containers.

2. Description of the Related Art

Traditionally, programming techniques utilize a flow of steps for a procedure or process. Processes and steps are carried out from one step to another until an entire procedure or task is completed. Decision points and branches further add flexibility and breadth to a traditional program. These types of traditional programs can be represented easily by flow charts.

However, computer programs have become much more complex in recent years, and often include coordinated operations and communications between processes that are running on independent computers which are Internet worked to each other. Processes executing on "client" computers may request invocation of processes on "server" computers on their behalf, to perform specific operations, gather or return data, or invoke other processes on still other computers.

This "distributed" nature of modem computing makes it very difficult if not impossible to represent in a flow chart form all possible combinations of steps, branches and decision points interrelating the processes which are executing at the same time on different computers. Further, the approach of using flow charts to describe the high level operation level of computer program is often times unwieldy to separate into individual design projects so that the computer program can be implemented by a large team of software engineers.

One approach employed to deal with these difficulties is to break large computer programs into relatively small, self-contained items referred to as "objects." The process of decomposition of a large program into "objects" often reveals a logical structure of the problem which is to be solved by the large computer program. The formalized approach to decomposing software programs into such self-contained items or "objects" is known as Object Oriented Programming ("OOP").

Objects are actually abstractions of physical entities or conceptual items. Objects have "states" and "identities" which are inherent to their existence, and they encapsulate "properties" or "attributes", and "operations" which may change those properties or attributes. The state of an object is determined by the values of its attributes at any given time, and those attributes may be changed through its operations of the objects. Many object-oriented programming languages have been adopted and are in widespread use today, including C, C++, Smalltalk, ADA, COBOL, and JAVA. Further, the terminology used within a given object-oriented programming language may be slightly different from each other, but may still represent the same concepts and design techniques. For example, implementations of an object's operations are referred to as "methods" in JAVA and "member functions" in C++.

Through the use of object-oriented programming techniques and technologies, objects which were developed or objects which were developed in different programming languages may interoperate, invoke each other, and communicate to each other.

In developing object-oriented programs, several well-known modeling methods have been developed, such as the different modeling methods developed by Booch, Jacobson and Rumbaugh. These three eventually converged and merged their modeling methods into what is now known as Unified Modeling Language ("UML"). The consortium formed by the UML developers is now called the Object Management Group ("OMG").

Although the older forms of object oriented programming modeling are still used by many engineers, UML has been adopted by many of the larger corporations involved in software development, as well as by various industry associations and consortiums.

When a designer is creating a new program or object using OOP techniques, he often relies on three main characteristics of the objects which he is including in his design. The first of those object characteristics is referred to as its "inheritance" characteristic. An object class describes a set of object end features, all of which share the same attributes and behaviors. A new class, called "subclass", may be created to define or describe a set of object instances which inherit all of the attributes and behaviors of the "superclass", or original class. As such, an object instance included in a subclass inherits all of these characteristics and functional capabilities of the members of the superclass, but it may "override" those behaviors and attributes by providing a new implementation for inherited characteristics. Inheritance is well understood in the art. Further, each object oriented programming modeling method provides for a visual format of representing object and their relationship to each other with respect to inheritance of attributes and behaviors.

A second characteristic necessary to be understood about an object or object class to be used during design of a new computer program is its "interface." An interface is an abstraction of the way that other processes or objects may instantiate or invoke a particular object. An object's interface describes the attributes and behaviors available within an object, as well as the parameters which must be provided to the object in order for it to perform its function. The interface also describes the return information or arguments provided by the object at the conclusion of or during the operation of its function(s). Thus, for a first object or process to effectively instantiate or otherwise use another second object, the first object must be aware of and use the interface of the second object to be used.

A third characteristic of an object which is necessary to be understood by a designer when using an object is where it is "contained." The object "container" holds a group of objects within it, and it may create and destroy "instances" of objects. But, containers do not create new objects. Thus, a container, which is a type of "collection manager", may manage the creation of instances of objects within the container upon request by other objects, and may destroy those instances when the requesting object is finished using the object. For example, if an object requests an instance of another object within a container, the manager associated with that container would create a new instance of the requested object and place that under control or at the disposal of the requesting object. The concept of "containment" in containers is well understood in the art, and the OOP modeling techniques provide for methods of illustrating containment.

With the rapid spread of distributed network computing, especially over the Internet, object oriented programming readily lends itself to the inclusion of and inter-operation of objects which are physically located on servers and clients which are disparate. For example, a process running on a computer in a bank may wish to calculate the current value of an investment account. Under traditional techniques, it may do this by accessing a local or remote database of data related to investment values, and performing all of the calculations locally.

Figure 1:
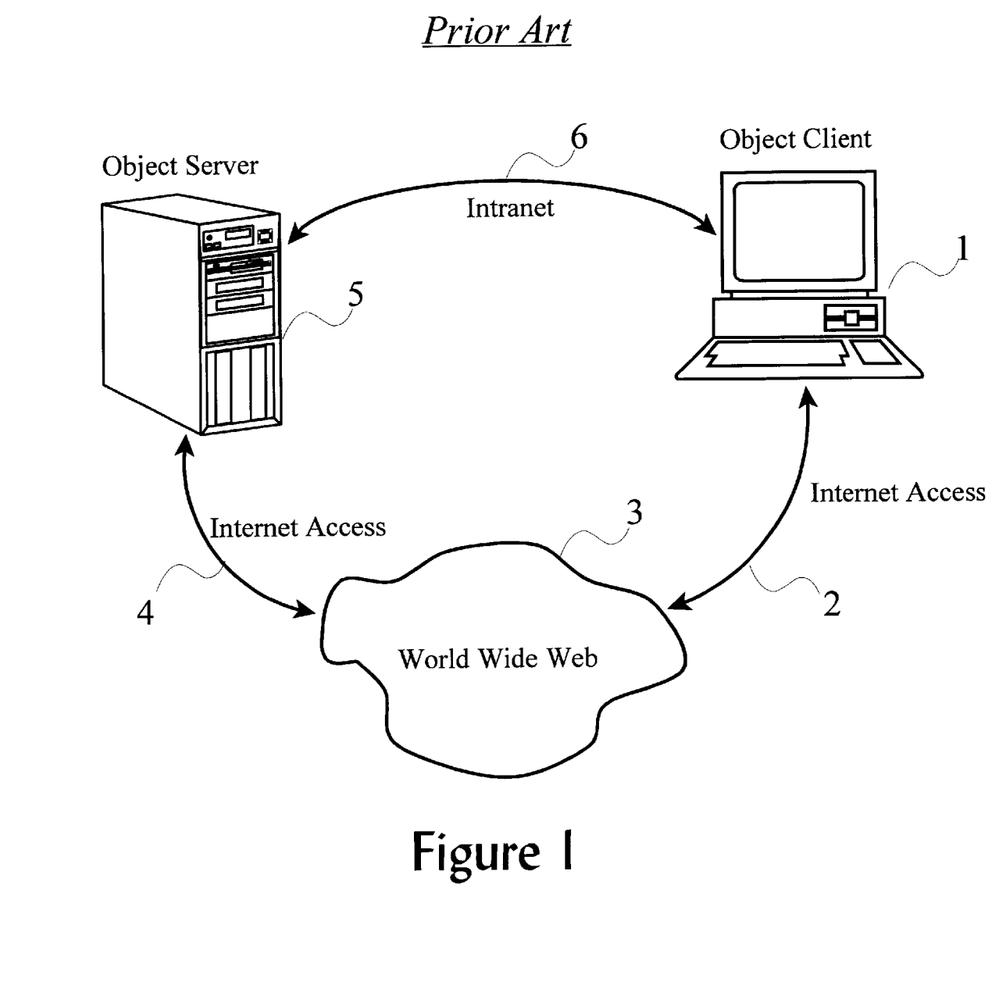
FIG. 1 illustrates the common arrangement of object client and object server computers, and especially that arrangement over computer networks such as the Internet.

However, using distributed OOP techniques, the process on the bank computer may simply request the creation of an object which can calculate the current value of an investment portfolio. This second object, which does the calculation, may either be located on the same server or located on another server over a computer network such as the Internet. FIG. 1 illustrates this type of client/server arrangement, wherein the bank computer of this example would be the "object client" computer (1), the "object server" (5) would execute the portfolio calculation methods at the request of the client computer (1), and communications of initial data and result data would be made over a computer network such as an Intranet (6) or the Internet (3).

As such, the OOP approach allows the programmer or designer of the bank computer program to defer the detailed knowledge and understanding of the portfolio calculation operation(s) to another designer who is more familiar with that operation or technology. OOP allows for more rapid development of new programs wherein designers of new programs can rely upon and incorporate the work product of other designers through the OOP technique and conventions. As in this example, the power and benefits of object oriented programming can be easily recognized by the fact that many programs of a highly complex nature can be quickly and efficiently constructed by accessing existing objects on local and remote servers over computer networks.

To assist and standardize the process of finding and using objects that other designers have completed, an architecture known as Common Object Request Broker Architecture ("CORBA") has been developed by the OMG. CORBA 2.0 is the currently adopted revision of the CORBA standard, which is well-known within the art. Using the techniques and conventions defined in the CORBA standard, designers of object oriented programs may easily and reliably access and use objects which are stored on local as well as remote servers with little or no prior knowledge of the existence of those objects, the details of those objects, or even the interface definition of those objects. In fact, CORBA allows for executing programs to dynamically discover the existence of needed objects, determine the necessary data needed to properly invoke and initiate the needed objects, and to invoke new instances of those objects at "run-time".

A key portion of the CORBA standard is known as Interface Definition Language ("IDL"), which defines and describes the interfaces of objects in a well-understood manner. IDL has been adopted as a standard by the International Organization for Standardization ("ISO"), and it is a simple language with similar syntax to C++ and JAVA. Interfaces which are defined by IDL can also be represented in UML representation. IDL is well-known in the art.

If an object is designed compliant with CORBA IDL, a remote client object may discover the existence of the object, ascertain its interface requirements, and request the creation of an instance of that object for use by the remote client. A remote client may also perform queries to determine the inheritance and containment characteristics of the object, as well as the exceptions it raises and the typed events it emits.

To achieve this remove discovery and invocation of objects, the CORBA standard provides for an Object Request Broker ("ORB") through which client objects may discover the existence of potential server objects including the operations they offer, and through which client objects may request the instantiation of object instances and control of those objects.

Figure 3:
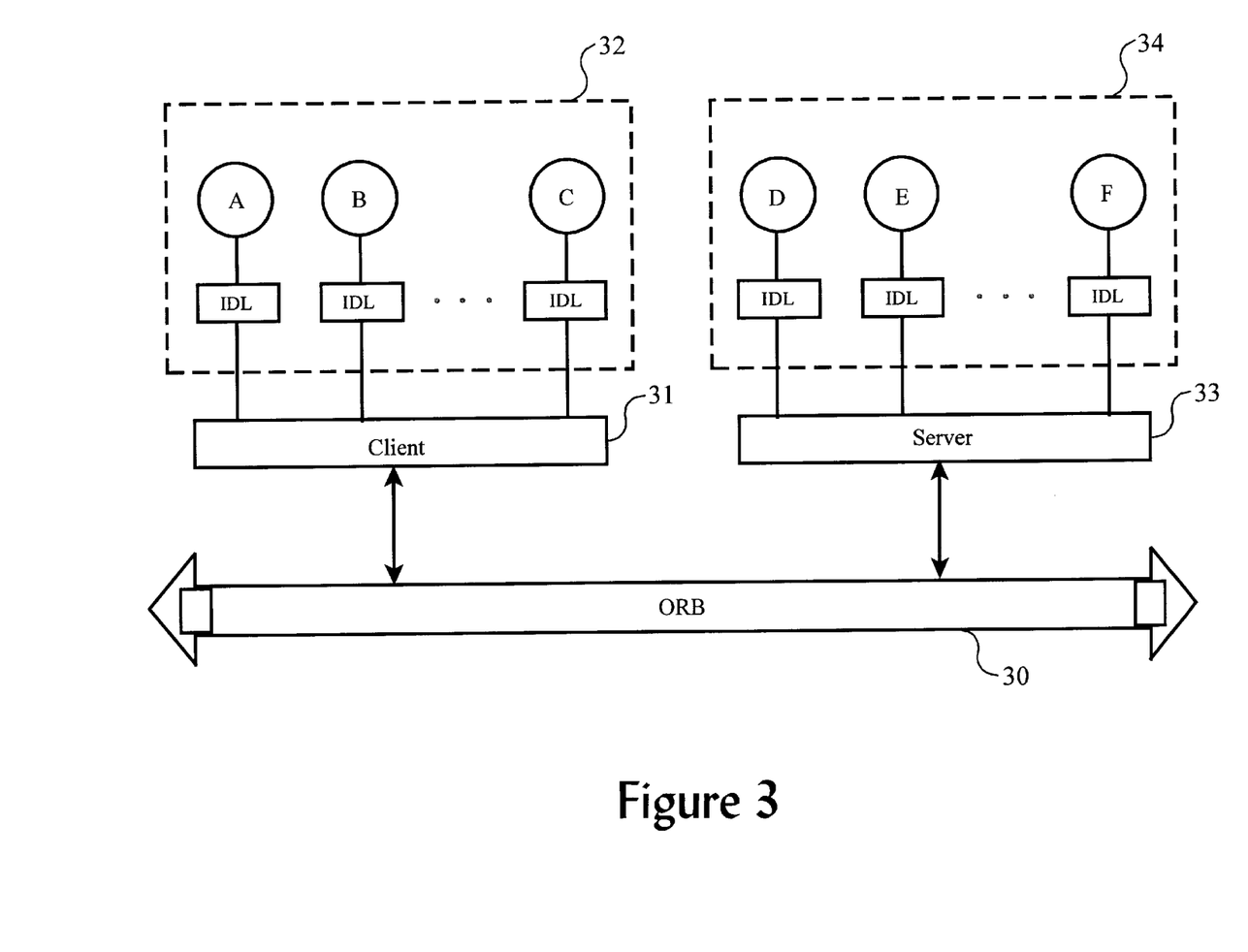
FIG. 3 presents the organization and interoperation of client objects and server objects via the CORBA ORB.

Turning to FIG. 3, the Object Request Broker ("ORB") (30) is shown in arrangement with client computers or processes (31) and server computers or processes (33). Each client object (32) provides an IDL interface, and each server object (34) does likewise. As such, client objects do not need to "know" where the distributed server objects actually resides, what operating system it executes under, or what programming language was used to develop it.

Figure 2:
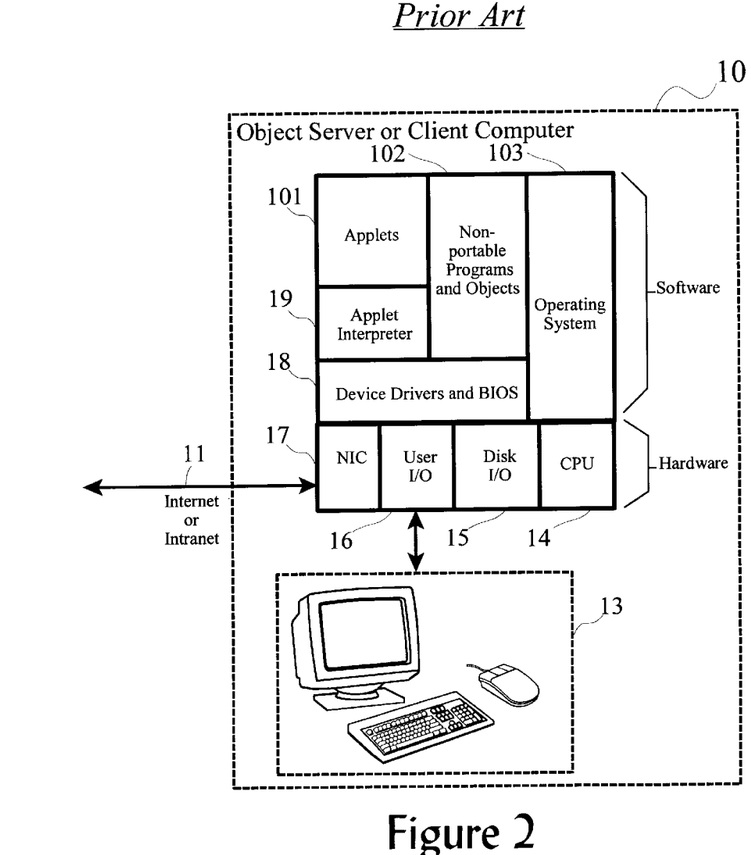
FIG. 2 shows the fundamental architecture of common networked object client and object server computer systems.

FIG. 2 discloses a generalized architecture of a computer platform (10) suitable for executing CORBA client objects and/or server objects. The computer may include a variety of user interface devices (13), such as a display, keyboard and mouse, but if the computer is to operate solely as a server, these may be omitted. The computer has a central processing unit ("CPU") (14), disk interfaces (15), interfaces (16) to the user interface devices, and a network interface card ("NIC") (17) such as a local area network ("LAN") card or modem. The NIC may interface to a Intranet or the Internet, or other suitable computer network (11). The computer is typically provided with a group of device drivers and basic input/output services ("BIOS")(18) and an operating system (103) such as UNIX, LINUX, IBM's AIX or OS/2, or Microsoft's Windows NT. Portable programs, such as Java Applets (101) may be interpreted by an interpreter (19), and non-portable programs (102) such as the CORBA-compliant server or client software may be executed on the platform (10) as well.

In order to facilitate the discovery of and invocation of server objects, the CORBA standard provides an Interface Repository ("IR"), which is an on-line database of object definitions. These object definitions can be captured through an IDL-compliant compiler or through the CORBA Interface Repository write functions. The CORBA specification establishes the details of how the information is organized and retrieved from the IR database by specifying a set of classes whose instances represent the IR's contents. Client objects may use the IR (or multiple IRs) to create run-time invocations of server objects, and development tools may use IRs to obtain interface definitions, inheritance structures, etc., regarding available objects. Interface Repositories are well-known within the OOP arts.

However, as OPP proliferates and becomes the primary method for software development, and as more and more object servers are made available over computer networks and the Internet, it becomes increasingly difficult for a software designer to search through all of the available objects for a particular function needed. While Interface Repositories provide primitive functions for finding a needed object, a single IR query may return many results. In most cases, it is desirable to understand more details as to the inheritancy, containment, and interface description than is available in a basic listings as provided by IR search facilities.

Therefore, there is a need in the art for an enhancement to a browser facility for interface repositories which allows a user to interactively select, review and inspect the inheritance in a graphical diagram, containment in a tree structure, and interface description language of objects within an Interface Repository. Further, there is a need in the art for this Interface Repository "browser" to allow editing, duplication, and deletion of interfaces contained within the database.

BRIEF DESCRIPTION OF THE DRAWINGS

The following detailed description when taken in conjunction with the figures presented herein present a complete description of the present invention.

SUMMARY OF THE INVENTION

The IR Browser/Editor provides a system, method and user interface for visually browsing and editing one more or CORBA Interface Repositories ("IR") for program objects. According to the preferred embodiment, a user selects an Interface Repository and an object within the Interface Repository. The IR Browser/Editor presents a three-pane view graphically depicting a containment tree, an object's interface definition language, and an inheritancy diagram of the selected object. The user may review the full interface definition language of the object, save the IDL or cut-and-paste it to another program such as a code editor for compiling. The user may also select a parent or child object within any of the three panes of the display, which causes the inheritance diagram, containment tree, and IDL panes to be updated to show the parent and child interfaces of the selected object, and the containment tree and IDL for the selected object, accordingly. As such, the user may "browse" graphically through a containment tree, an IDL listing, or an inheritance diagram, interactively, but successively selecting objects shown in each view. Optionally, the user may control the level of detail shown in each pane, and may choose to filter the information presented according to user preferences. The user may edit an Interface Repository as he "browses" it by copying, adding, and deleting objects in the database.

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a set of objects for execution on a OOP development computer, such as a personal computer running Microsoft Windows NT or IBM's OS/2 operating system. According to the preferred embodiment, the objects are developed using the Java programming language compliant with CORBA 2.0 IDL, but alternate suitable programming languages may be used to realize the objects described in the following paragraphs. The invention may be realized as a "stand alone" tool, or in conjunction with an OOP code development tool.

A CORBA Interface Repository ("IR") is a database containing a collection of objects that are defined by CORBA Interface Definition Language ("IDL"). According to the preferred embodiment, the IR database is extended to include the full IDL language in source form, as well as to include a list of objects used by each object in the database.

The IR Browser/Editor provides a flexible, user-friendly and powerful graphical tool to browse and modify multiple IRs on both local and remote machines. The tool requires no programming and no knowledge of CORBA programming interfaces.

Figure 4:
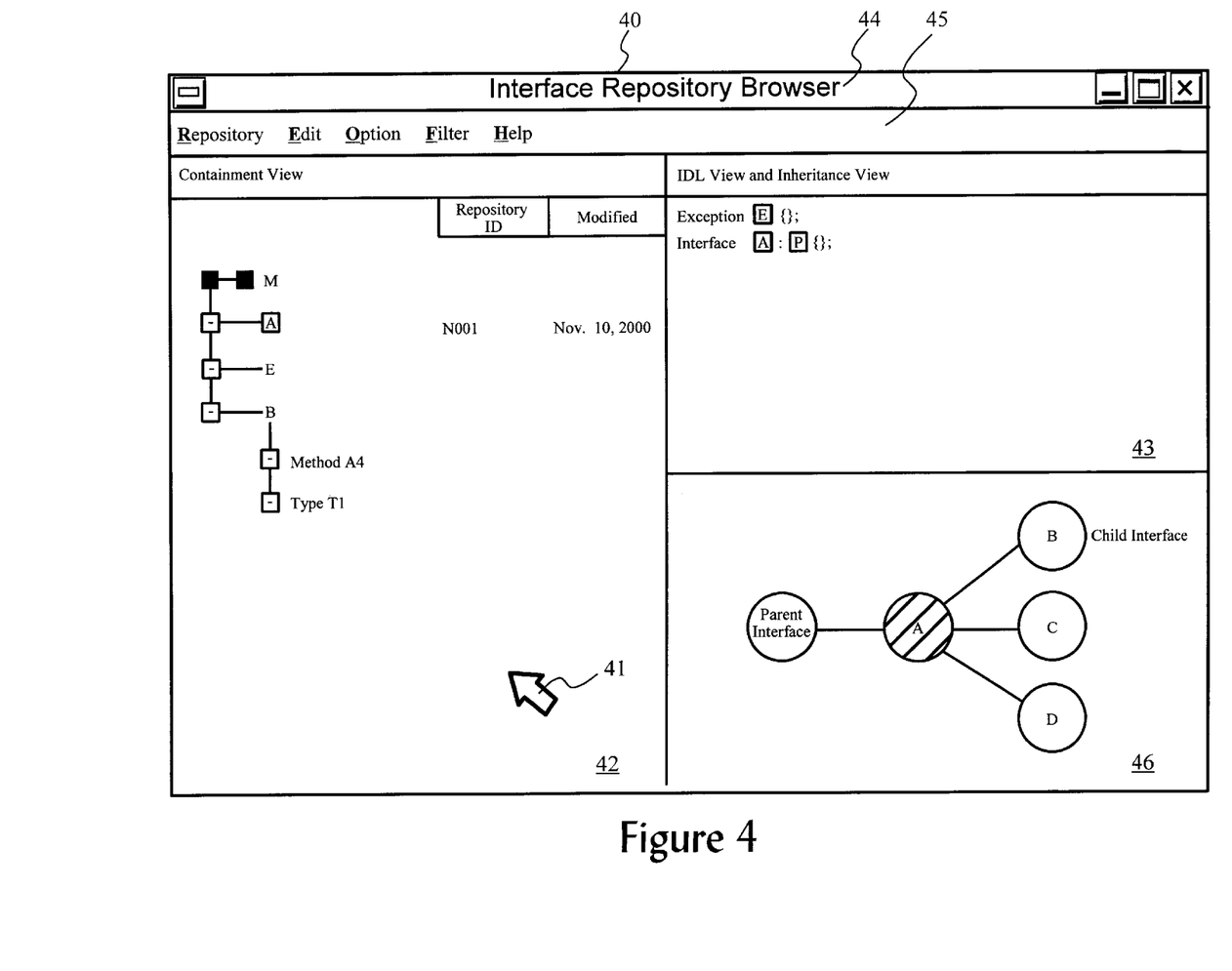
FIG. 4 provides an illustration of a user interface for viewing the containment tree, inheritance diagram and IDL of an interface.

The invention is preferably realized as a set of objects which can be invoked by any program, and especially by an OOP code development tool. Upon invocation, a graphical user interface ("GUI") frame (40) is presented with a title bar (44) containing the name of the viewer, such as "Interface Repository Browser". The GUI is also preferably provided with a pointing and selection icon ("the mouse pointer"), but other methods for navigating the contents of the display such as by use of a TAB key and ENTER key, as are well-understood in the art and are reasonable alternatives. The GUI may be displayed on any suitable computer display, such as a CRT, LCD or plasma interface.

The frame (40) is also provided with a menubar (45), in which several drop-down menu options are displayed. The frame (40) is divided into three display panes: a Containment View pane (42), an IDL View pane (43) and an Inheritance View pane (46). Preferably, the system is provided with a pointing device and corresponding pointer icon (41) for use in selecting items and icons within the frame (40).

Browsing Using the Containment View

Within the Containment View pane (42) is shown a tree view that displays a list of IDS elements in the forms of objects. Each object is represented by a node in the tree, and columns of associated information such as the object's date of last modification or its repository ID, are preferably shown in line with each object in the tree. The objects can be modules, interfaces, operations, attributes, unions, structures, type definitions, exceptions and constants. A variety of icons and colors can be used to display each type of object in the tree view for optimal visual presentation of information regarding the containment hierarchy.

A node in the tree in the Containment View (42) can be expanded or collapsed using icons such as "+" and "−" icons. A container node such as an interface can be expanded to nodes that represent operations, attributes, type definitions, constants and exceptions that are contained in the interface. Container nodes themselves can be repositories, modules, interfaces, structures, unions and exceptions, and if appropriate, their member lists will be displayed.

The default action when a node is selected is to display that node's IDL definition in the IDL View (43) pane, and its inheritance relationship of the selected interface of the containing interface in the Inheritance View (46). So, each time the user selects an item in the Containment View (42), the IDL View (43) and Inheritance View (46) displays are automatically updated to reflect information about the newly selected item in the Containment View (42).

Using the Filter drop-down menu from the menubar (45), the user may increase or decrease the level of detail presented in the Containment View (42).

Each node preferably is enabled with user-selectable actions. For example, right-clicking on any of the objects in the Containment view (42) invokes a pop-up menu of actions available for that object.

Browsing Using the IDL View

Within the IDL View pane (43), the IDL definition for objects in the IR are is shown in hypertext. If a user selects any user-defined type shown in the IDL View pane (43), the selected type or object will be displayed in the Containment View pane (42) and in the Inheritance View pane (46). This allows the user to browse through the IR by the IDL view, as well as the Containment View, by simply clicking on items in the IDL view.

The user may select to display the full IDL of an object, may copy-and-paste the IDL into another program such as a code editor, or may save the selected IDL text as a file for later use.

Browsing Using the Inheritance View

The third pane provided by the IR Browser/Editor is an Inheritance View pane (46) in which an inheritance hierarchy diagram is shown, centered on a selected IR item. The inheritance hierarchy diagram displays the immediate parent and child or children interface(s) for a selected IR item. If the user selects one of the displayed child interface or the parent interface in the Inheritance View (46), the browser will automatically update the IDL View (43) and the Containment View (42) displays. And, the immediate base (parent) interfaces and immediate derived (child) interfaces of the newly selected interface are displayed in the Inheritance View pane (46). A user preference is supplied in the in preferred embodiment that allows the user to enable an expanded, two-level inheritance diagram in which two levels of immediate parent and child interfaces are shown, instead of just one immediate level of parent and child interfaces.

Interactive Browsing Using All Views

So, the Containment View (42), IDL View (43) and Inheritance View (46) provide for three views of the same selected object or interface, and selection of any displayed item in any view causes all three panes to be updated to show the information for the selected item. As such, the user start browsing an IR at an initial interface within an IR by selecting an object by name or repository ID, and then he may "navigate" and "browse" visually through all the related objects using the three-panes of the GUI window interactively.

Object Model of the Invention

Figure 5:
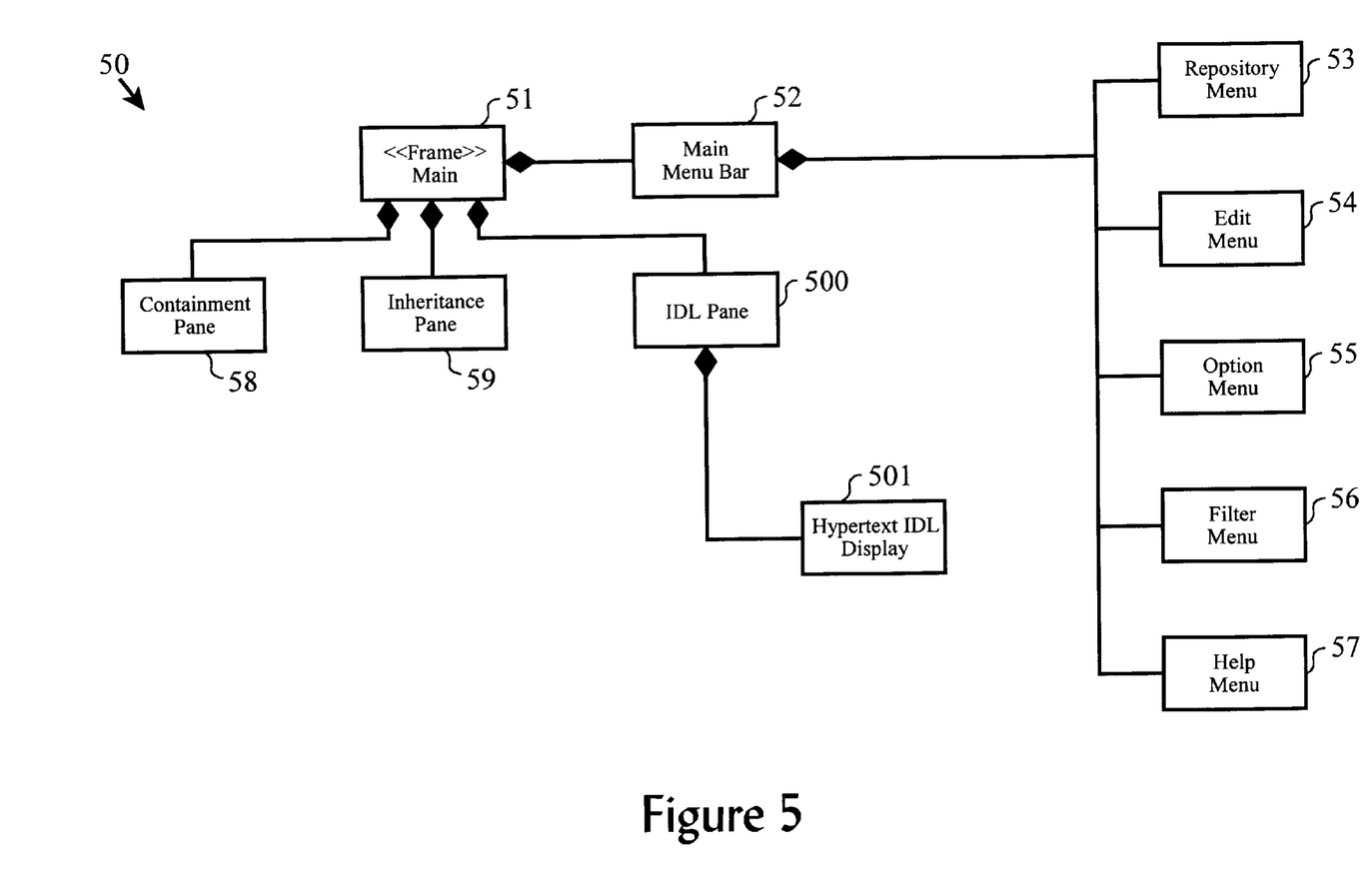
FIG. 5 shows the object model for the system and method of the invention.

Turning to FIG. 5, the object model (50) of the graphical browser for Interface Repositories is shown. The main frame (51) display may invoke objects to display the menubar display object (52), the Containment View pane display object (58), the Inheritance View pane display object (59), and the IDL View pane display object (500).

The menubar object (53) preferably invokes for a Repository menu object (53) which allows the user to save IDL as a file, print the display, reload or refresh the display, and exit the tool.

The menubar object also preferably invokes an Edit menu object (54), which allows the user to add, delete and copy objects and interfaces in the IR. This allows the user to utilize the invention not only as a browser for the objects in the IR, but as an editor to create or modify objects in the IR.

An Option menu object (55) is also preferably invoked by the menubar upon selection of the drop-down list on the display, which allows the user to update the repository according to any changes he may have made.

The Filter menu object (56) preferably is invoked by the menubar to allow the user to specify a level of detail shown in the Containment View (42) pane, such as enabling the columnar information including the repository ID, date of last modification, location of object, etc. The Filter menu also preferably allows the user to select an optional two-level display in the Inheritance view which shows two immediate levels of parent and child interfaces instead of just one. Other user preferences could be provided under this drop-down menu as necessary.

A Help menu object (57), which may be invoked by the menubar, is provided to allow online help document access or use of help wizards.

Three display objects are invoked main frame (51) to generate the displays in the three panes, and to receive user selections of items displayed in the frames. The Containment View pane display object (58) provides the tree structure display in the Containment View (42) as previously described, and invokes the other display objects when an item is selected within the Containment View (42) to accomplish the changes in the other panes.

The IDL View pane display object (500) provides the hypertext listings (501) for the interface definitions in the IDL View (43), as previously described, and allows the user to save the text information for an interface definition into a file. The IDL View pane display object (500) invokes the other display objects when an item is selected within the IDL View (43) to accomplish the changes in the other panes.

The Inheritance View pane display object (59) products the inheritance diagram in the Inheritance View (46) for an object and its immediate parent and child interfaces, as previously described. It, too, invokes the other display objects when an item is selected within the Inheritance View (46) to accomplish the changes in the other panes.

Well-known methods of the CORBA IR superclasses "Contained", "Container", and "IRObject" are available for the Containment View, Inheritance View and IDL View pane display objects (58, 59, 500) to invoke in order to retrieve information regarding interfaces and objects that may be selected by the user from one of the views. As the selected object in the view will be known by name, ID, and relationship to the previously selected object, appropriate IR queries such as Look_up and Describe, can be made to obtain full details of the newly selected object.

All of the display objects (58, 59 and 500) allow resizing of the displayed pane, as well as detaching the pane to be displayed in its own window or frame.

It will be understood from the foregoing description that various modifications and changes may be made in the disclosed preferred embodiment of the invention without departing from its true spirit and scope, such as the use of alternate programming methodologies or languages, alternate computer platforms and software, operating systems and communications protocols. It is intended that this description is for purposes of illustration only and should not be construed in a limiting sense. The scope of this invention should be limited only by the language of the following claims.

What is claimed is:

1. A method for allowing a user to visually browse and edit interfaces and objects contained in Interface Repositories, said Interface Repositories comprising an on-line database accessible through a search and query protocol, said interface repositories being stored on one or more server computers and storing interface descriptions for program objects, said interface descriptions including containment, inheritance and interface definition language information, the method comprising the steps of:

providing a containment view, an interface definition language view and a inheritance view for a selected object, each of said views containing a plurality of displayed items;

allowing a user to re-select an item in a view;

retrieving containment, interface definition language and inheritance information for the re-selected item from an Interface Repository through an Interface Repository search and query protocol; and updating the containment view, interface definition language view and the inheritance view according to the retrieved information.

2. The method as set forth in claim 1 wherein the step of retrieving information for a re-selected item comprises posting CORBA-compliant Interface Repository queries.

3. The method as set forth in claim 1 further comprising the step of providing hypertext listings within said interface definition language view such that upon selection by a user, a full interface definition can be viewed.

4. The method as set forth in claim 1 further comprising the step of providing a user-selectable interface definition language saving operation that, when selected, saves interface definition language to a computer-readable file for a selected item in a view.

5. A computer-readable medium having program code stored therein for allowing a user to visually browse interfaces and objects contained in Interface Repositories, said Interface Repositories comprising an on-line database accessible through a search and query protocol, said interface repositories being stored on one or more server computers and storing interface descriptions for program objects, said interface descriptions including containment, inheritance and interface definition language information, said program code causing a workstation having a processor to perform the steps of:

providing a containment view, an interface definition language view and a inheritance view for a selected object, each of said views containing a plurality of displayed items;

allowing a user to re-select an item in a view;

retrieving containment, interface definition language and inheritance information for the re-selected item from an Interface Repository through an Interface Repository search and query protocol; and updating the containment view, interface definition language view and the inheritance view according to the retrieved information.

6. The computer-readable medium as set forth in claim 5 wherein the program code for retrieving information for a re-selected item comprises program code for posting CORBA-compliant Interface Repository queries.

7. The computer-readable medium as set forth in claim 5 further comprising program code for providing hypertext listings within said interface definition language view such that upon selection by a user, a full interface definition can be viewed.

8. The computer-readable medium as set forth in claim 5 further comprising program code for providing a user-selectable interface definition language saving operation that, when selected, saves interface definition language to a computer-readable file for a selected item in a view.

9. An Interface Repository Browser in an object-oriented software development workstation for visually browsing interfaces contained in on-line Interface Repository databases, said Interface Repository Browser comprising:

an Interface Repository search facility for retrieving object information including inheritance, containment and interface definition language from an on-line Interface Repository;

an interactive, three-view display for displaying a containment hierarchy tree, an IDL listing and an inheritance view for a selected object based upon the object's information retrieved using said Interface Repository search facility; and a display update function responsive to user selection of an item in said three-view display for retrieving object information from an Interface Repository using said search facility and for updating said three-view display to represent the inheritance, containment hierarchy and IDL listing for the user-selected item.

10. The Interface Repository Browser as set forth in claim 9 wherein said Interface Repository search facility is adapted to search and retrieve object information from Common Object Request Broker Architecture Interface Repositories.

11. The Interface Repository Browser as set forth in claim 9 wherein said interactive, three-view display comprises a hypertext interface definition language display for allow user activation of hyperlinked text to full interface definition language listings.

12. The Interface Repository Browser as set forth in claim 9 further comprising a interface definition language file creation function which, when selected by a user, saves interface definition language for a specified interface to a computer-readable file.

\* \* \* \* \*